…

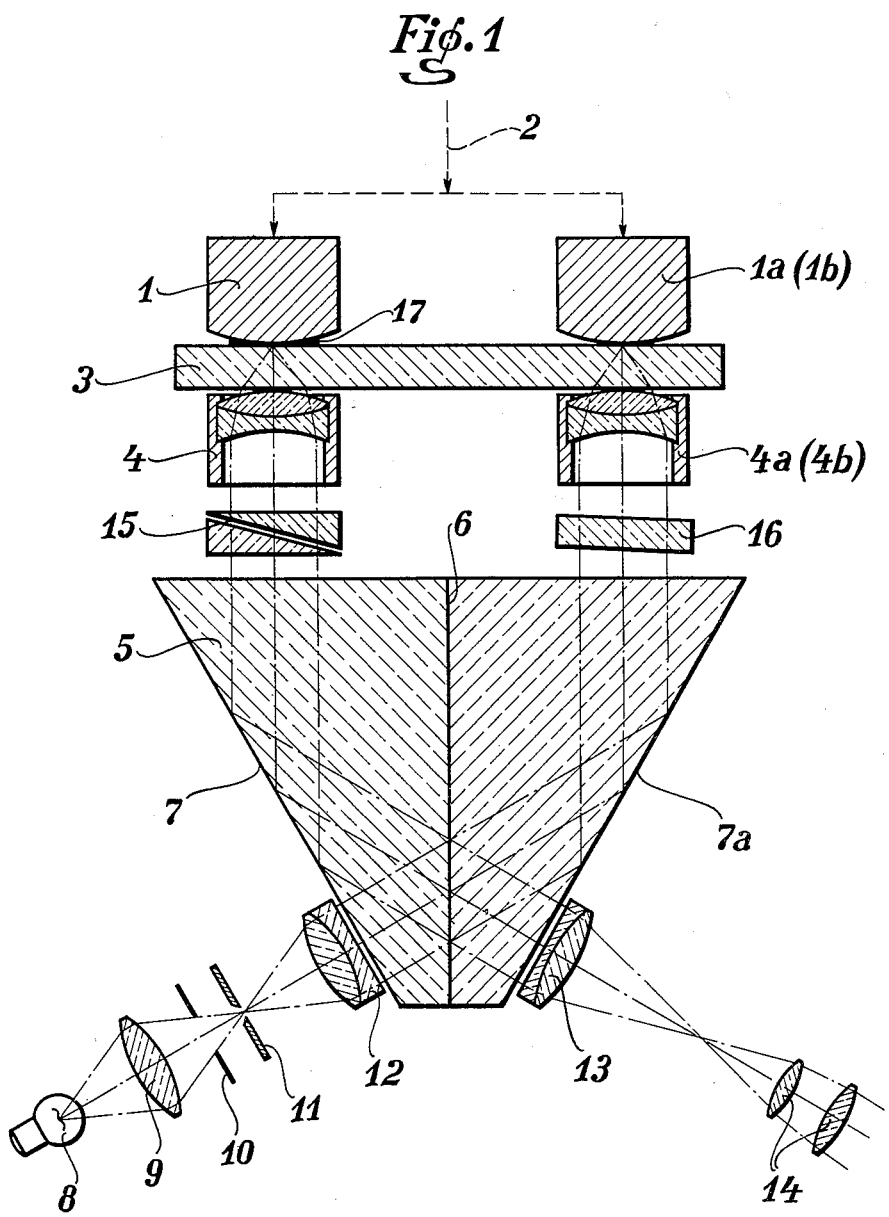
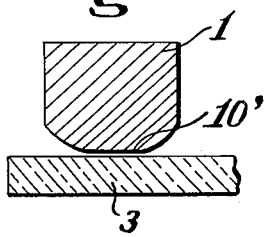

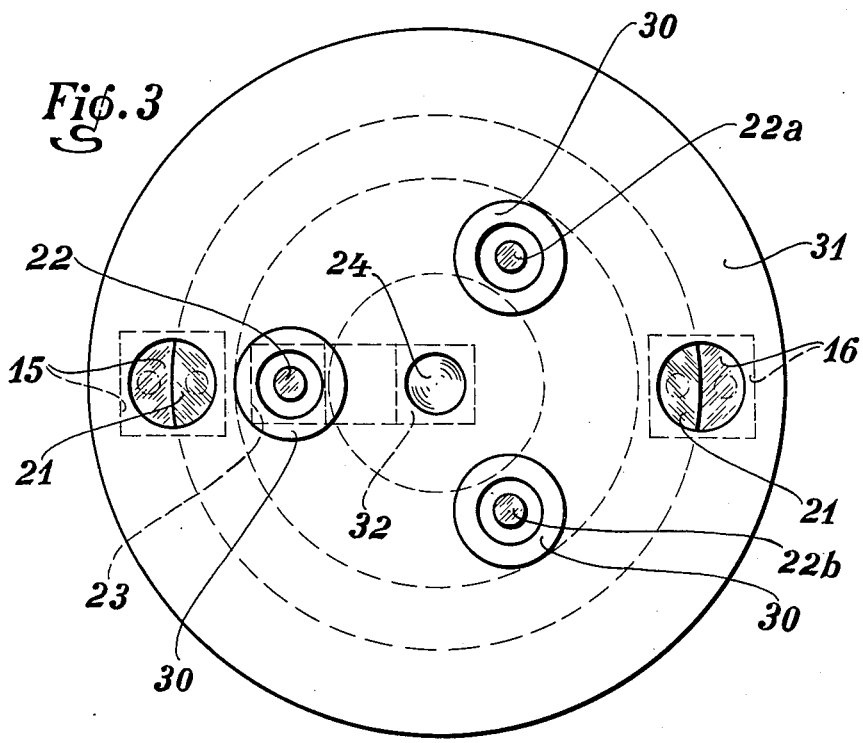
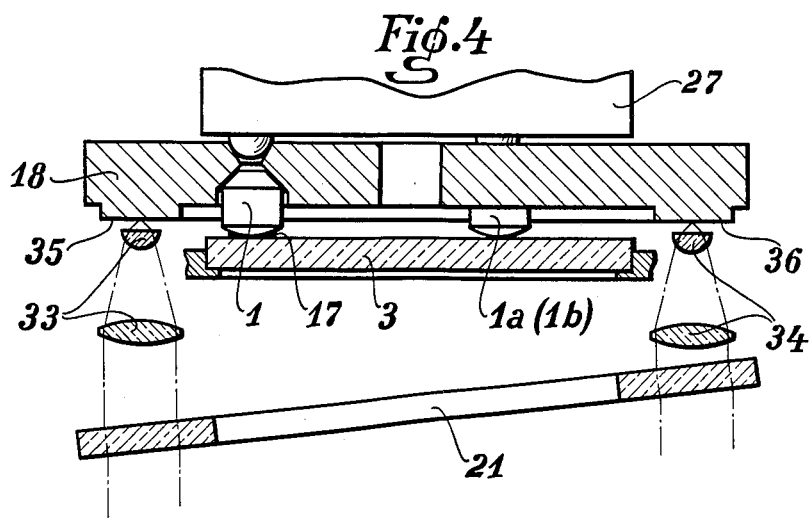

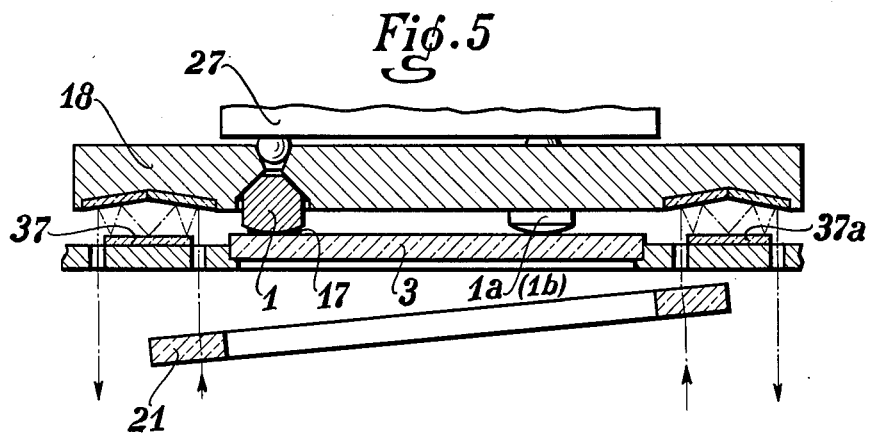
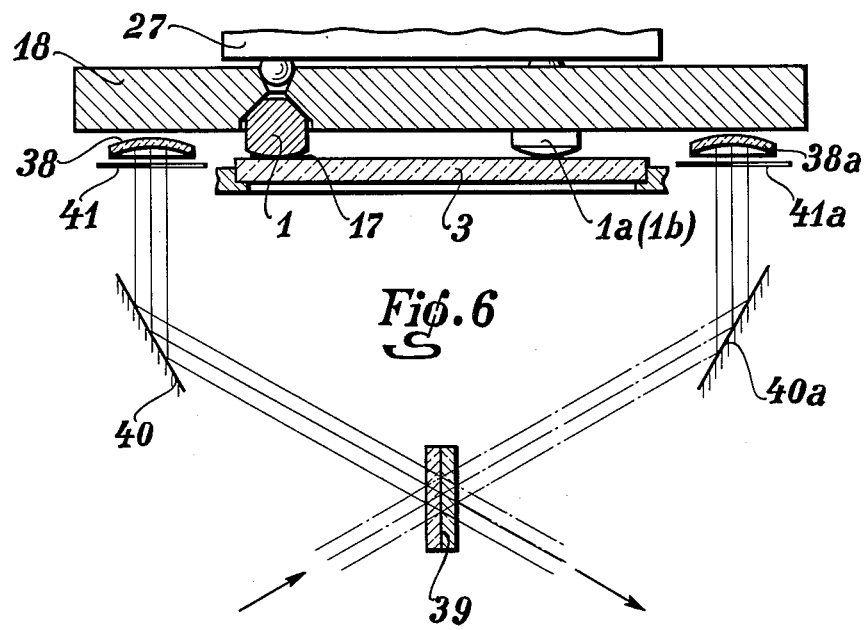
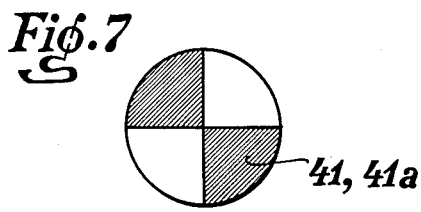
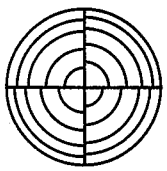

United States Patent Office 2,718,811
Patented Sept. 27, 1955

2,718,811

APPARATUS FOR DETERMINING THE THICKNESS OF ADSORBED SUPPORTING LIQUID LAYERS

Hermann Riepert, Willi Horn, and Felix Stumpf, Wetzlar, Germany, assignors to Ernst Leitz, G. m. b. H., Wetzlar, (Lahn), Germany, a corporation of Germany Application July 31, 1952, Serial No. 301,854

21 Claims. (Cl. 88—14)

The present invention is an improvement on the invention of Leo Ubbelohde and Hermann Riepert disclosed in an application Ser. No. 295,286, filed June 24, 1952, in which the thickness of an adsorbed layer of a liquid between two surfaces is measured by varying the pressure applied to said surfaces with a view to determining the bearing capacity of the liquid.

The present invention relates to the measurement of very thin layers or films under pressure as, for example, of the order of magnitude of thousandths of millimeters or of microns. This requires the very accurate measurement of the thickness of very thin films and the elimination of all sources of errors such as may be brought about by stresses on the testing element or its supports. The invention provides, therefore, apparatus particularly suited for this purpose. More particularly it obviates those errors in measurement which result from the compression or distortion of the testing elements in which the layer or film to be tested is subjected to pressure.

The invention concerns itself with an apparatus which avoids these errors and attains required precision of measurement. It encompasses several units each comprising a pressure element provided with a reaction or counterpressure element of which units, one or more, serves for pressure loading the layer or film and one serves as control unit for eliminating the deformation of the pressure elements by the pressure and counter or reaction pressures through a differential measurement of the control unit with at least one of the elements under observation. In a particular embodiment of such an apparatus, the opposed pressure and reaction elements are joined to a transparent plane parallel plate on which lies directly the observation objectives and through which light beams, or pencils, are directed to the several testing units by means of a light beam splitter. Interference phenomena of these light beams directed to the liquid film or layer and to the control unit indicate or measure the differences between the opposite surfaces in the control unit and testing units, because the influence of the compression on the units themselves is the same for all (their equality being supposed for all) and accordingly has no action on the interference phenomena.

With this arrangement the disadvantage still exists that one path of light extends through the layer or film of liquid so that the index of refraction of the layer, and whatever dependence it may have upon the pressure, enters into the measurements. For this reason, in further modification of the invention each pressure element is mounted in a reflecting plate and two coherent light beams are supplied to two diametrically opposed places on the reflecting plate. With this mounting, a micro objective can be arranged under the pressure elements for the observation of the pressure loci free from dust through the opposed or reaction pressure plate.

With interference comparators it is a known procedure to balance the light path of one light beam against another light beam by placing in one beam a glass double wedge and placing in the other a tilted plane parallel plate. In interference comparators which are arranged for observation by trans illumination, with or without an objective lying between a light beam splitter and a combining device for the separated beams, this equipment accomplishes with the use of white light the occurrence of the two known achromatic fringes of equal inclination. Interference comparators with incident illumination also give the same effect in case they comprise objectives. In contrast, the two achromatic fringes cannot occur with top light interference compartors without objectives because the tilted plate is traversed twice.

In one form of apparatus embodying the invention, an interference comparator is provided with vertical or incident illumination in which the light path through the above mentioned double wedge and the glass plate are made equal. For the production of achromatic fringes there is provided besides this, a special tiltable plane parallel plate which can be formed as a ring and can stand in both light paths. In case vertical illumination apparatus has no objectives lying between the light beam splitter and the light beam combining element, the light beams must be so turned that each beam shall penetrate the tilted plate only once.

The new application of a special tilted plate which is common to both light paths has also an independent meaning for vertical light interferometers for it has the advantage that the influencing of the achromatic fringes is independent of the equalization of the light paths. It is of special advantage that a single plate common to both light paths can be used.

The interference fringes do not permit a very small shifting to be measured because of their shading following the cosine square law. According to the invention a light stop or screen is, therefore, mounted in the eye-piece which, relative to its shading, equally follows the cosine-square law. One measures, therefore the fringe shift by shifting the screen until an equal shading of the field of view is obtained.

An improvement in the precision of observation is also given according to the invention by placing mirrors in fixed position in opposed relation to the areas of the reflecting plate in which are contained the pressure elements. By multiple reflection, due to the inclination of the reflecting plate, the difference in the light paths of the coherent beams increases.

Instead of the described arrangement of the kind of interference comparators one can, according to the invention, attain the required very high precision of measurement by other forms of embodiment in which one opposes to the areas used on one side of the reflecting plate lenses having a semi-permeable mirrored surface. One then attains Newton's rings of very great sharpness because of the multiple interference between the lens and the reflecting surface. The ring systems of two light beams, for example, of which one strikes the mirror surface lying near the test unit provided with the layer to be tested and the other strikes a reflecting surface which lies near the test unit without a layer are introduced by the beam splitter into a respective half of the field of view of an eyepiece. With this arrangement one is enabled to determine the layer thickness with a precision of a few millimicrons.

In order to determine exactly the pressure exerted one can, according to the invention, provide the pressure elements with spherical pressure surfaces which are partially ground to a plane surface.

In the accompanying drawings there is shown by way of example apparatus embodying the invention in which, Fig. 1 is a diagram of apparatus following the principle of an interference comparator;

Fig. 3 is a section along the line A—B of Fig. 2;

Fig. 4 is a modification of certain elements of Fig. 2;

Fig. 5 is a further modification of elements of Fig. 2;

Fig. 6 is a diagram of an arrangement for evaluating Newton's rings;

Fig. 7 is a view of a screen;

Fig. 8 is a diagrammatic reproduction of the field of observation of Fig. 7, and Fig. 9 is a vertical sectional view of a modified form of a pressure unit having a spherical surface partially ground to a plane surface.

Figure 2:
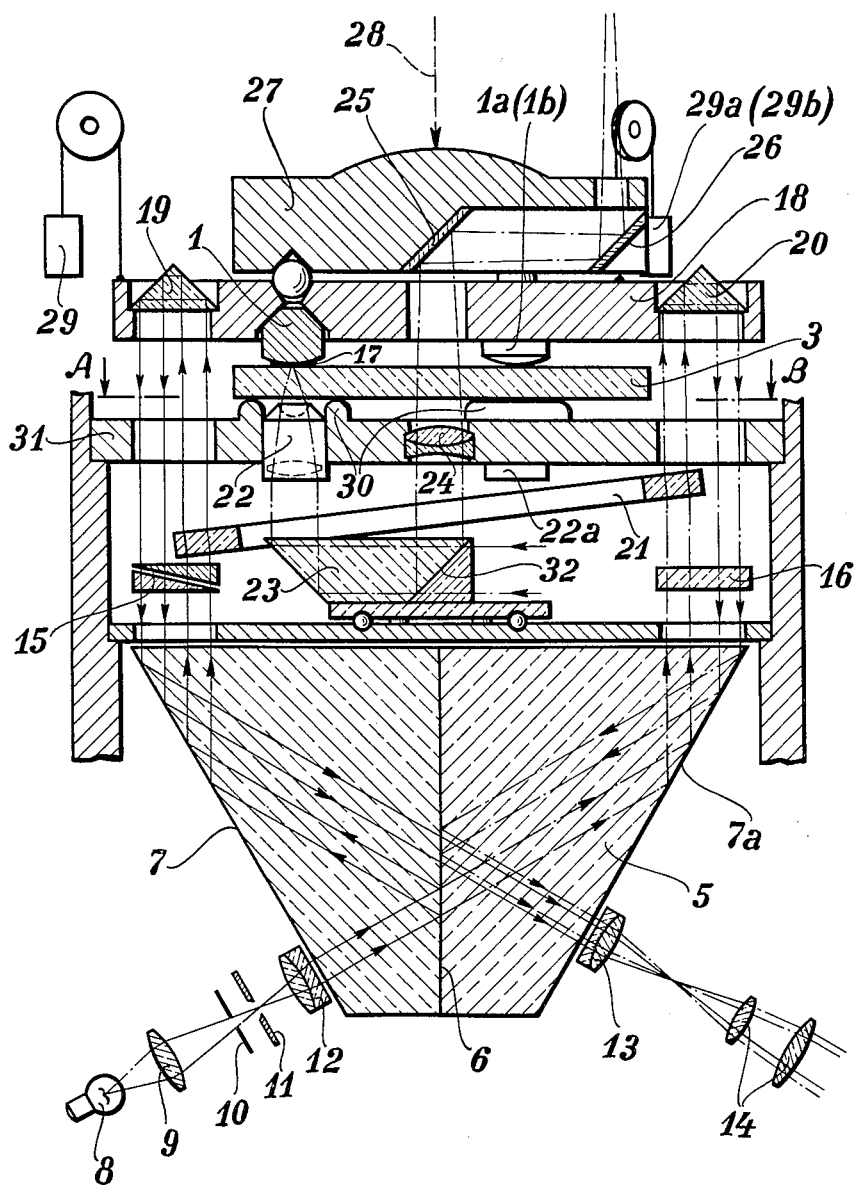
Fig. 2 is a similar diagram but with a separation of the observation units from the test units.

In the apparatus of Fig. 1 there are three units each unit having a spherical pressure surface of polished steel, said units being arranged in the corners of an equilateral triangle and an associated counter-pressure element. The oil to be tested is inserted into one of the units which thus serves as a testing unit. The units are placed under equalized pressure by an apparatus 2 indicated diagrammatically and acting at the center of the equilateral triangle. Only two elements 1 and 1a are shown in Fig. 1 as the third unit would be in alignment with element 1a. As mentioned above the spherical pressure surfaces may be partially ground to a plane surface as indicated at 10' in Fig. 9.

The counterpressure element consists of a plane parallel glass plate 3 which rests on the apices of three equal objectives of which two, 4 and 4a, are shown in the drawings which are securely mounted on a support, not shown, and the dust free observation of the pressure elements and especially of an oil layer 17 is made possible.

Under two objectives, namely 4 and 4a, is a light beam splitter 5 which has a semi-permeable splitting surface 6 and reflecting surfaces 7 and 7a. At 8 is a light source with a condensing lens 9, a diaphragm 10, a slit 11, and an objective lens 12. An objective 13 and an eye-piece 14 are provided on the side from which observations are to be taken. In each of the coherent light beams a compensating plate is arranged of which one, 15, consists of two glass wedges arranged in the usual way and of which the other, 16, is a tiltable glass plate. A sample of the oil to be tested is brought between the glass plate 3 and the pressure element 1. By the application of a white light there will appear in the field of view of the eye-piece two achromatic fringes since the other interference bands vanish because of the color compensation of their position. If the pressure elements are placed under pressure, deformation of the glass plate 3 and objectives 4 and 4a in both light paths are substantially equal so that they have no noticeable influence on the interference phenomenon. Notwithstanding, the refractive-index of the oil layer 17 enters into the same.

This disadvantage is avoided in the constructions of Figs. 2 and 3. Here are three pressure elements 1, 1a and a third one, not shown, set into a plate 18 which near the pressure element 1 carries an angle mirror, for example a prism 19, and diagonally opposite it a second angle mirror, a prism 20. The coherent light beams coming from the light beam splitter 6 are turned by the angle mirrors. Conpensation plates 15 and 16 here serve for the exact equalization of the light paths while a tiltable plate 21 of annular formation serves to produce the two achromatic interference fringes. As is apparent from the light beam path shown, the plate 21 brings about a slight relative displacement of the two light beams entering the objective 13 whereby the two achromatic interference fringes are brought about.

Also in this arrangement the pressure elements may be observed dust free by an eye-piece, not shown, through microscope objectives 22, 22a and 22b, a prism 23, below the pressure elements and rotatable on a vertical axis equidistant from these eye-pieces, and thence through an intermediate objective 24 and mirrors 25 and 26. Pressure is transmitted to the pressure element through a plate 27 as indicated by the arrow 28. The weight of the plate 18 which carries the mirror elements 19 and 20, as well as the pressure elements is compensated by three counterbalance weights of which two, 29 and 29a, appear in the drawings. Also in this embodiment the counterpressure elements are joined to one single plane parallel glass plate 3 resting upon beads 30 on a base plate 31. The rotatable prism 23 is provided with a light beam splitting surface 32 through which the light of a lamp, not shown, passes to the observation post.

In using the apparatus of Figs. 2 and 3, the position of the interference fringes is observed when no oil is present. Then tests of the oils under investigation are made in one or two of the pressure elements. Thereby the plate 18 comes to an inclined position and the distances of the mirror prisms 19 and 20 from the beam splitting surface 6 are then no longer equal so that the interference fringes are displaced. If pressure is exerted at 28 the interference fringes shift again. This new position of the interference fringes compared with their position when no oil was present gives a measure of the thickness of the oil layer under pressure. Since the pressure acts equally on all three pressure elements, the deformation of the elements caused by the pressure has no influence on the position of inclination of the plate 18. The measurements are carried out in contrast to that with the apparatus of Fig. 1 independently of the index of refraction of the oil because the generation of the interference fringes results from the agency of the mirror prisms 19 and 20 and not through the oil.

With the aid of the observing arrangement 23, 24, 25 and 32, one can make sure that no dust is present between the pressure elements 1, 1a and the one not shown and the plate 3 as the prisms are shifted in succession to the three positions under the pressure elements.

In Fig. 4 an arrangement is shown in which the angle mirrors 19, 20, are avoided. The production of achromatic interference fringes can be accomplished by the aid of an inclined glass plate 21 in such a manner that two exactly equal microscope objectives 33 and 34 are placed in the coherent pencils of light. In this arrangement the plate 18 has two plane reflecting surfaces 35 and 36.

The measurements follow the same method as described above for the apparatus of Figs. 2 and 3.

The two achromatic interference fringes possess, in known manner, a density pattern according to the cosine-square law to the phase difference of the coherent pencils of light. Thence the fringes are not sharp. Their position does not enable them to be measured with great exactness by a locating mark on the eye-piece. According to a further improvement of the invention, one may increase the precision of measurement by bringing into the eye-piece a screen which possesses the same density pattern. One photographs for example the two interference bands and positions the transparent positive obtained in a micrometric eye-piece. The adjustment then follows by seeking the position in which the field of view is equally darkened. A shifting of the bands becomes apparent through the occurrence of clearer borders so that they can be exactly measured through a positioning of the micrometer until the borders are extinguished.

The path difference of the interfering pencils or beams of light, and accordingly the precision of measurement, can be increased as shown in Fig. 5 by causing the light beam or pencil of light to pass several times back and forth between pairs of inclined reflectors 18a, 18b, 18c and 18d mounted on the under surface of the movable plate 18 and spaced from mirrors 37 and 37a fixedly arranged opposite to them. Since the angle alteration of the plate 18 caused by the oil layer is small, the mirrors 18a, 18b, 18c and 18d respectively may be angle mirrors in order to bring the outcoming light pencil parallel to the ingoing pencil of light.

In Fig. 6 an arrangement is diagrammatically illustrated in which semi-permeable mirrored stationary lenses 38 and 38a are placed in opposition to the reflecting surface 18. With this arrangement Newton rings result which are very sharp because of the manifold reflection between the mirror and the lens surface and, therefore, can be measured very precisely.

Through the beam splitting surface 39, two pencils of light are formed which are directed through mirrors 40 and 40a to the observation points of the plate 18 where the lenses 38 and 38a are placed in opposition. The upper surface of each lens is provided with a semi-permeable silvering or mirror. Near the undersurface of each of the lenses 38 and 38a is placed a screen 41, 41a, Fig. 6, which covers two opposite quadrants as shown in Fig. 7. Accordingly there appear in the field of observation of the eye-piece in each of the opposed quadrants parts of the same ring system as is shown in Fig. 8.

By measuring the diameter of the ring the distance of the mirror plate 18 from the lenses can be measured and with it the thickness of the oil film can be measured with a precision of a few millionths of a millimeter and can be evaluated as a function of the applied pressure.

Having described our invention, what we claim is:

1. Apparatus for determining the thickness under pressure of a liquid layer adsorbed between surfaces of solid bodies for determining the bearing capacity of said liquid which comprises a counter pressure support, a group of three units of which at least one is a testing unit supported in spaced positions on said support, two reflecting surfaces relatively displaceable by relative displacement of units from said support by a liquid film adsorbed on one of said units, a pressure applying element to apply pressure equally to said units against said counter pressure support, a light source, a light beam splitter positioned to direct separate light beams, one beam to each of said two reflecting surfaces and to combine the beams reflected from said two reflecting surfaces to form interference fringes of said combined reflected beams and means for observing the shifting of said interference fringes because of the relative phase displacement of the beams by film of liquid adsorbed to one unit, independently of any deformation of elements of the apparatus by the applied pressure.

2. The apparatus of claim 1 in which said units and counterpressure elements comprise opposed convex and concave surfaces respectively.

3. The apparatus of claim 1 in which said units have convex reflecting surfaces opposed to plane, transparent surfaces of said counterpressure elements.

4. The apparatus of claim 1 in which said units have convex reflecting surfaces and said counterpressure support comprises one transparent plane parallel plate, observation objectives supporting said plane parallel plate, the apparatus having a light beam splitter for supplying coherent beams of light to said testing units and for combining the beams reflected from said elements, and in which said means for observing the interferences comprises an eye-piece for viewing the fringes of interference of said recombined reflected beams.

5. The apparatus of claim 4 in which glass plates are provided in the coherent light beams to obtain fringes of interference of equal inclination.

6. The apparatus of claim 4 having one tiltable glass plate lying in the coherent split light beams and common to both beams.

7. The apparatus of claim 4 having a sliding screen in the observation eye-piece with shading sequences complementary to the interference fringes.

8. The apparatus of claim 4 in which the test elements are provided with opposed fixed mirrors positioned to reflect the coherent light beams successively to provide an increased path for said beams.

9. The apparatus of claim 1 in which the pressure applying elements are set into a reflecting plate and in which semi-reflecting lenses are positioned in opposed relation to reflecting areas of the said plate to create Newton's rings and in which the Newton rings are reflected into parts of the eye-piece field view.

10. The apparatus of claim 2 in which the convex surface of the pressure applying element is provided with a central plane surface opposed to the counterpressure element.

11. Apparatus for determining the thickness under pressure of a liquid layer adsorbed between surfaces of solid bodies for determining the bearing capacity of said liquid which comprises a transparent counterpressure support, three units supported in spaced positions on said support, a pressure applying element to apply pressure equally to said units against said transparent counterpressure support, a light source, a light beam splitter positioned to direct separate light beams through said counterpressure support, one beam to each of two of said units and to combine the beams reflected from said two units to form interference fringes of said reflected beams of light because of the relative displacement by the liquid layer adsorbed to one unit, and means for observing the shifting of said interference fringes upon displacement of one of said units by an adsorbed film of liquid.

12. Apparatus for determining the thickness under pressure of a liquid layer adsorbed between surfaces of solid bodies for determining the bearing capacity of said liquid which comprises a supporting plate, three units supported on said supporting plate and symmetrically and equally spaced about a center of pressure, a tiltable unit carried by said three units to tilt with changes in relative position of said units on said supporting plate, a pair of reflectors fixed to said tiltable unit spaced to be displaced relatively from said supporting plate by relative displacement of said units, a pressure means acting at said center of pressure to apply pressure equally to each of said three units against said supporting plate, a beam splitter positioned to split a light beam and direct the split beams to said reflectors and to joint the reflected light and an observation element to observe the interference fringes of said reflected light beams.

13. The apparatus of claim 12 having a tiltable, annular plate in the paths of said split light beams passing to said reflectors.

14. The apparatus of claim 12 having a pair of mirrors, one for each reflector, positioned to reflect the beam between each mirror and its respective reflector before it is reflected to said observation element.

15. Apparatus for determining the relation of the thickness of films of liquid adsorbed to two opposed surfaces under pressures imposed on said surfaces for the determination of the bearing capacities of said films which comprises a pressure supporting plate, a pressure plate opposed to a surface of said supporting plate and having three pressure units mounted at equally spaced distances therein to bear against a surface of said supporting plate, said pressure units having convex surfaces bearing against said surface of said supporting plate, means to apply pressure centrally of and spaced equidistant from said pressure units, at least one of said pressure units acting as a test unit to receive a film of adhered liquid and thereby to tilt said pressure plate on the other units, said pressure plate having a pair of mirrors spaced from each other and positioned to be moved unequally relative to said supporting plate, means to direct coherent light pencils to said mirrors and to vary the light paths of said pencils to form interference fringes and means to determine the shifting of said fringes as said pressure plate is tilted by said film of adsorbed liquid.

16. The apparatus of claim 15 in which said supporting plate is transparent opposite said pressure units in which the surfaces of said pressure units have reflecting surfaces opposed to said plate and having means to direct a light beam to the space between said pressure units and said supporting plate and means to magnify the light reflected from said space by said pressure units in order to observe whether there are any dust particles between the pressure elements.

17. The apparatus of claim 16 in which said means to direct a light beam to said pressure units is rotatable to direct said light to each unit individually.

18. The apparatus of claim 16 in which said means to direct light to said pressure unit comprises a prism rotatable on an axis central of said pressure units and having reflecting surfaces to reflect light to an individual unit and to reflect light reflected by said unit to a point of observation.

19. The apparatus of claim 15 in which said means to vary the coherent light paths to and from said mirrors comprises a glass plate in the path of said coherent light pencils and tiltable to deflect said several light paths.

20. The apparatus of claim 15 in which said means to direct pencils of coherent light to said mirrors comprises a pair of prisms joined on a common surface to form a semi-reflecting surface to reflect part of a pencil of light to one of said mirrors and transmit part of said pencil to the other mirror.

21. The apparatus of claim 20 in which each of said mirrors of said pressure plate comprises a pair of mirrors and inclined at an angle to each other and an opposed mirror to reflect the light beam back and forth.

References Cited in the file of this patent

UNITED STATES PATENTS

| | | |
|---|---|---|
| 1,044,502 | Crehore et al. | Nov. 19, 1912 |
| 1,455,825 | Wood | May 22, 1923 |
| 2,434,029 | Williams | Jan. 6, 1948 |
| 2,571,937 | Peck | Oct. 16, 1951 |
| 2,591,666 | Barkas et al. | Apr. 8, 1952 |